(12) United States Patent
Goldfarb et al.

(10) Patent No.: US 9,179,302 B2
(45) Date of Patent: *Nov. 3, 2015

(54) SYSTEM AND METHOD FOR COMMUNICATION TERMINAL SURVEILLANCE BASED ON SPEAKER RECOGNITION

(75) Inventors: Eithan Goldfarb, Ness Ziona (IL); Yoav Ariav, Kfar saba (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 140 days.

This patent is subject to a terminal disclaimer.

(21) Appl. No.: 13/284,498

(22) Filed: Oct. 28, 2011

(65) Prior Publication Data

US 2012/0116762 A1 May 10, 2012

(30) Foreign Application Priority Data

Oct. 28, 2010 (IL) .......................................... 208970

(51) Int. Cl.
*G10L 17/00* (2013.01)
*H04W 12/02* (2009.01)
*H04L 29/06* (2006.01)

(52) U.S. Cl.
CPC .............. *H04W 12/02* (2013.01); *G10L 17/00* (2013.01); *H04L 63/308* (2013.01)

(58) Field of Classification Search
CPC ..... G10L 15/063; G10L 15/02; G10L 15/187; G10L 2015/0631; H05K 999/99; G06F 21/32; G06F 21/86; G06F 21/10; G07C 9/00087; H04M 3/5175; H04M 3/51; H04M 3/22; H04M 3/2254; H04M 3/36; H04M 3/2281; H04M 11/04; H04M 11/045; H04M 2242/04; H04M 3/533; H04M 3/42221; H04M 3/5158; H04M 1/65; H04M 2201/40; H04M 3/4938; H04M 1/663; H04M 3/493; H04M 15/00; H04M 15/38; H04M 1/57; H04Q 3/00

USPC .......................... 704/243, 247; 713/194, 186; 379/265.06, 265.07, 26.01, 29.09, 379/32.01, 32.05, 35, 37, 38, 39, 40, 41, 45, 379/67.1, 68, 69, 70, 88.01, 88.02, 88.08, 379/88.17, 88.19, 88.21, 93.03, 114.14, 379/120, 142.05, 142.06

See application file for complete search history.

(56) References Cited

U.S. PATENT DOCUMENTS 6,101,242 A * 8/2000 McAllister et al. ......... 379/88.02
7,272,728 B2 * 9/2007 Pierson et al. ................ 713/194

(Continued)

FOREIGN PATENT DOCUMENTS

WO 2010116292 A2 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Jakieda Jackson
(74) *Attorney, Agent, or Firm* — Meunier Carlin & Curfman

(57) ABSTRACT

A Candidate Isolation System (CIS) detects subscribers of phone call services as candidates to be surveillance targets. A Voice Matching System (VMS) then decides whether or not a given candidate Communication Terminals (CTs) should be tracked by determining, using speaker recognition techniques, whether the subscriber operating the candidate CT is a known target subscriber. The CIS receives from the network call event data that relate to CTs in the network. The CIS detects candidate CTs using a unique candidate isolation process, which applies predefined selection criteria to the received call events data.

14 Claims, 2 Drawing Sheets

(56) References Cited

U.S. PATENT DOCUMENTS

| | | | |
|---|---|---|---|
| 7,629,897 B2* | 12/2009 | Koljonen | 340/4.13 |
| 7,676,544 B2* | 3/2010 | Murakami et al. | 709/204 |
| RE43,324 E* | 4/2012 | Blair et al. | 379/67.1 |
| 8,249,224 B2* | 8/2012 | Creamer et al. | 379/88.01 |
| 8,447,619 B2* | 5/2013 | Zopf | 704/500 |
| 8,553,854 B1* | 10/2013 | Weaver et al. | 379/88.02 |
| 2006/0048211 A1 | 3/2006 | Pierson et al. | |
| 2006/0111904 A1* | 5/2006 | Wasserblat et al. | 704/246 |
| 2007/0201683 A1* | 8/2007 | Saiin et al. | 379/360 |
| 2008/0162135 A1* | 7/2008 | Claudatos et al. | 704/243 |
| 2009/0215449 A1* | 8/2009 | Avner | 455/433 |
| 2010/0094987 A1* | 4/2010 | Spalt | 709/224 |
| 2011/0201305 A1* | 8/2011 | Buer et al. | 455/410 |
| 2013/0072257 A1* | 3/2013 | Evans et al. | 455/558 |
| 2013/0179161 A1* | 7/2013 | Zopf et al. | 704/230 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Meyer, Ulrike, et al., "On the Impact of GSM Encryption and Man-in-the-Middle Attacks on the Security of Interoperating GSM/UMTS Networks," IEEE, 2004, 8 pages.

* cited by examiner

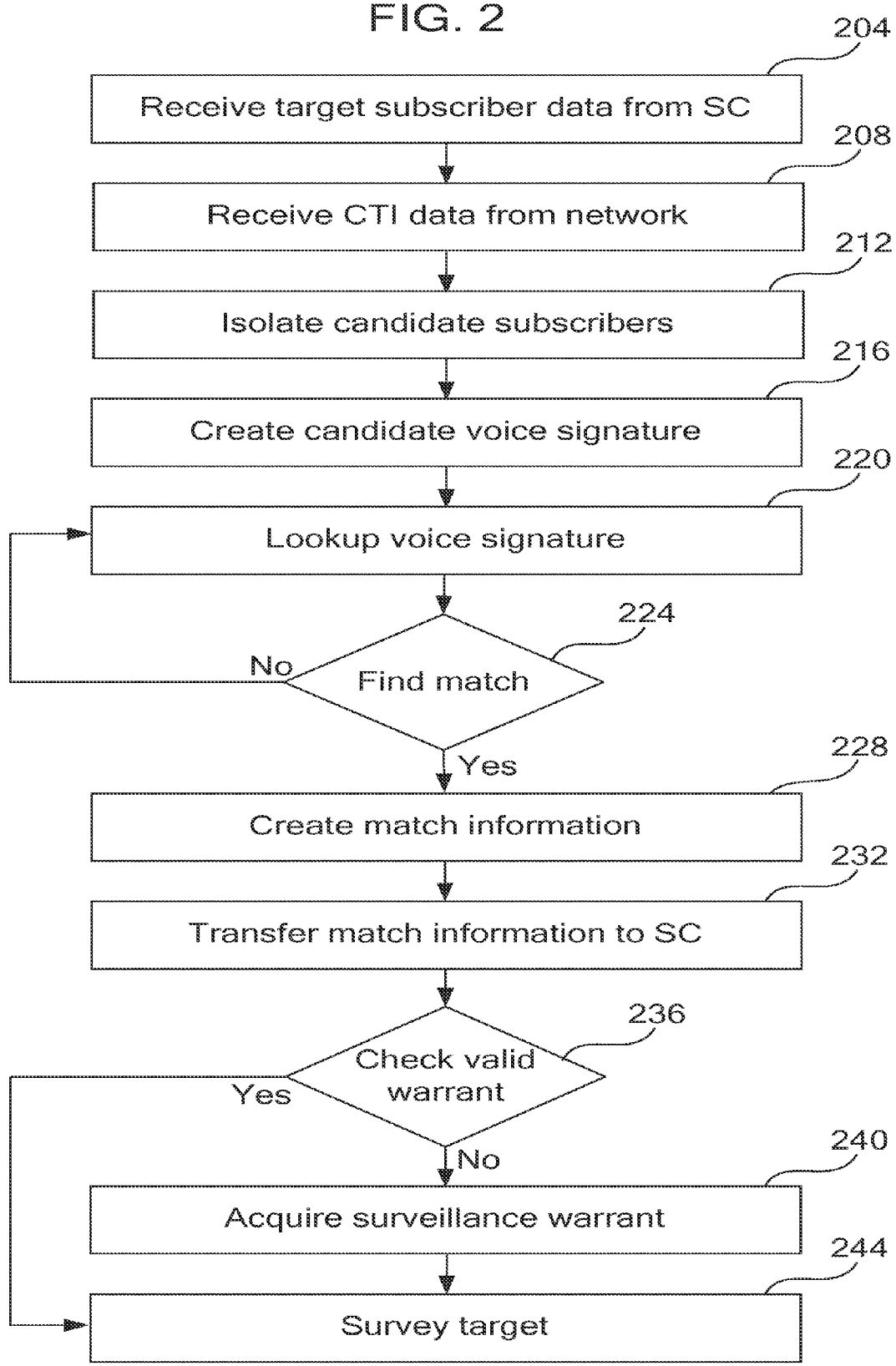

SYSTEM AND METHOD FOR COMMUNICATION TERMINAL SURVEILLANCE BASED ON SPEAKER RECOGNITION

FIELD OF THE DISCLOSURE

The present disclosure relates generally to communication networks, and particularly to methods and systems for subscriber recognition in communication networks.

BACKGROUND OF THE DISCLOSURE

Various techniques are used for recognizing subscribers of telephone networks, for various purposes, such as authorized eavesdropping and location tracking of mobile subscribers. The subscribers are usually recognized according to their telephone identifiers in the network. Common identifiers in cellular networks are International Mobile Subscriber Identity (IMSI), Mobile Subscriber Integrated Services Digital Network Number (MSISDN) and International Mobile Equipment Identity (IMEI).

Text-independent speaker identification techniques are described, for example, by Reynolds and Rose, in "Robust Text-Independent Speaker Identification using Gaussian Mixture Speaker Models," IEEE Transactions on Speech and Audio Processing, volume 3, no. 1, January, 1995, and by Monte et al., in "Text Independent Speaker Identification on Noisy Environments by Means of Self Organizing Maps," Proceedings of the Fourth International Conference on Spoken Language (ICSLP), October, 1996, which are incorporated herein by reference.

SUMMARY OF THE DISCLOSURE

An embodiment that is described herein provides an apparatus, including:

a storage unit, which is configured to store data regarding one or more target subscribers of a communication network; and at least one processor, which is configured to identify a communication terminal of the communication network as a candidate for surveillance, to receive voice originating from the identified communication terminal, to attempt to match the voice to at least some of the data stored in the storage unit, and, upon finding a match between the voice and the data of a specific target subscriber, to output an association between the communication terminal and the specific target subscriber.

In an embodiment, the at least one processor is configured to identify the communication terminal as the candidate by detecting that the communication terminal uses an identifier that was not used before. In another embodiment, the at least one processor is configured to identify the communication terminal as the candidate by detecting that the communication terminal is inactive or shut-down for at least a predefined time period. In yet another embodiment, the at least one processor is configured to identify the communication terminal as the candidate by detecting that the communication terminal is located in a predefined geographical area. In still another embodiment, the at least one processor is configured to identify the communication terminal as the candidate by detecting that the communication terminal communicates with one or more predefined communication terminals.

In some embodiments, the data stored in the storage unit includes respective voice signatures of the target subscribers, and the at least one processor is configured to attempt to match the voice to one of the voice signatures. In a disclosed embodiment, the voice includes voice samples from one or more voice calls originating from the communication terminal. In an embodiment, the at least one processor is configured to provide the association between the communication terminal and the specific target subscriber to a surveillance center that is connected to the communication network.

In an embodiment, upon finding the match, the at least one processor is configured to initiate issuance of a warrant for performing surveillance on the communication terminal. In another embodiment, upon finding the match, the processor is configured to cause assignment of surveillance resources for performing surveillance on the communication terminal. In a disclosed embodiment, the at least one processor is configured to identify the communication terminal using at least one identifier type selected from a group of types including an International Mobile Subscriber Identity (IMSI), an International Mobile Equipment Identity (IMEI), and a Mobile Subscriber Integrated Services Digital Network Number (MSISDN).

In some embodiments, the at least one processor is configured to receive data related to the communication terminal from the communication network, and to identify the communication terminal as the candidate based on the data. In an embodiment, the at least one processor is configured to receive the data from at least one source selected from a group of sources consisting of a service provider operating the communication network and a network probe that monitors the communication network. In an embodiment, the at least one processor is configured to receive the voice from at least one source selected from a group of sources consisting of a service provider operating the communication network and a network probe that monitors the communication network.

There is additionally provided, in accordance with an embodiment that is described herein, a method, including:

storing data regarding one or more target subscribers of a communication network;

identifying a communication terminal of the communication network as a candidate for surveillance;

receiving voice originating from the identified communication terminal;

attempting to match the voice to at least some of the data stored in the storage unit; and upon finding a match between the voice and the data of a specific target subscriber, outputting an association between the communication terminal and the specific target subscriber.

The present disclosure will be more fully understood from the following detailed description of the embodiments thereof, taken together with the drawings in which:

BRIEF DESCRIPTION OF THE DRAWINGS

FIG. 2 is a flowchart that schematically illustrates a method for communication subscriber surveillance, in accordance with an embodiment that is described herein.

DETAILED DESCRIPTION OF EMBODIMENTS

Overview

Figure 1:
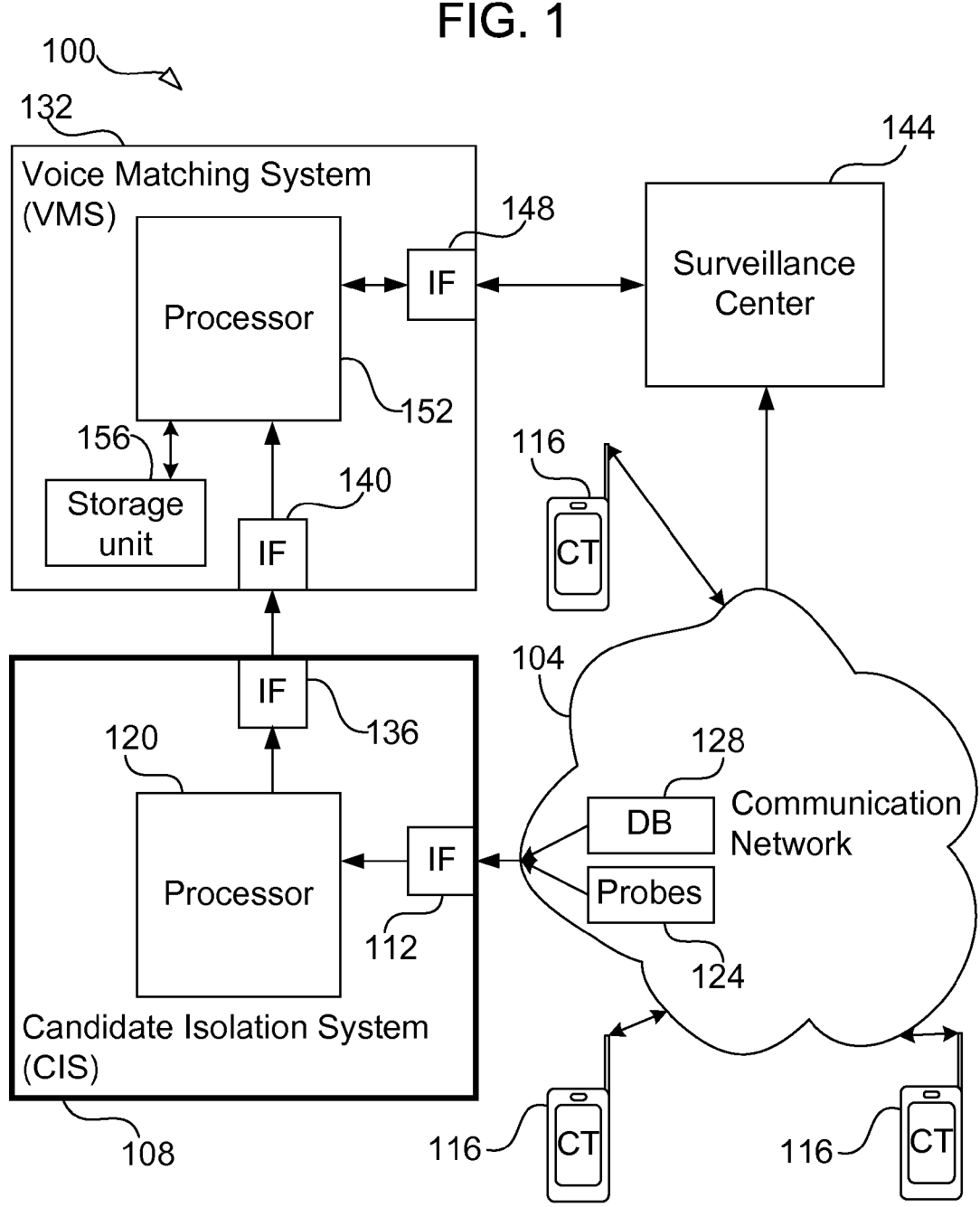
FIG. 1 is a block diagram that schematically illustrates a system for communication subscriber surveillance, in accordance with an embodiment that is described herein.

Embodiments that are described herein provide improved systems and methods for surveillance of subscribers of communication networks, wherein the subscribers are potential targets of some surveillance actions. In the disclosed techniques, a Candidate Isolation System (CIS) detects subscribers of phone call services as candidates to be surveillance targets. Telephones and other voice communication terminals are referred to herein as Communication Terminals (CTs). A Voice Matching System (VMS) then decides whether or not a given candidate CT should be tracked by determining, using speaker recognition techniques, whether the subscriber (individual) operating the candidate CT is a known target subscriber.

The CIS receives from the network call event data that relate to CTs in the network. The CIS detects candidate CTs using a unique candidate isolation process, which applies predefined selection criteria to the received call events data. Example selection criteria may comprise a new CT identifier in the network, a long recent CT inactivity period, a long recent CT shutdown period, a geographical location of the CT, a CT identifier of the other party of a call, a geographical location of the other party of a call and/or any suitable combination of the above criteria. (Since each CT is identified in the network uniquely using a respective identifier, the terms "candidate CT" and "candidate CT identifier" are used interchangeably herein.)

In an example embodiment, the VMS holds a set of voice signatures of known target subscribers who should be tracked. When considering a certain CT as a candidate for tracking, the VMS attempts to match voice originating from the candidate CT to one of the voice signatures. If a match is found, the VMS associates the candidate CT with the known target subscriber whose voice signature produced the match. Typically, the association between the candidate CT and the known target subscriber is reported to a Surveillance Center (SC) for subsequent tracking of the candidate CT.

By utilizing speaker recognition techniques, the disclosed system is able to identify a CT that is operated by a known target subscriber, even if the identifier (e.g., IMSI, IMEI or MSISDN) of the CT is not known to belong to this subscriber. As such, the disclosed techniques are highly effective against target subscribers who change phones or Subscriber Identity Modules (SIM) in order to evade surveillance. In some embodiments, the methods and systems described herein can be used to obtain surveillance warrants for subsequent tracking of candidate CTs. Additionally or alternatively, the methods and systems described herein can be used for focusing on known target subscribers instead of indiscriminately tracking any candidate CT. Using these techniques, tracking resources can be assigned efficiently. Furthermore, isolating a small group of candidate CTs out of the entire network CTs, using the above selection criteria, saves considerable voice processing and voice recognition processing resources.

A typical network comprises a wireless cellular network. In alternative embodiments, the network may comprise an Internet Protocol (IP) based network, such as the global Internet in which the candidate identifiers pertain to subscribers of a Voice over IP (VoIP) service over the Internet, a satellite communication network, a Public Switched Telephone Network (PSTN) or any other suitable network type.

System Description

FIG. 1 is a block diagram that schematically illustrates a system 100 for target subscriber surveillance, in accordance with an embodiment that is described herein. The figure focuses on identifying telephone subscribers of a communication network 104, who are potential targets of some surveillance actions. In an embodiment, network 104 comprises a wireless cellular network such as a 3rd Generation Partnership Project (3GPP) Long-Term Evolution (LTE) network, a Global System for Mobile communication (GSM) network, a Universal Mobile Telecommunication System (UMTS) network, a CDMA2000 network or other third generation (3G) or fourth generation (4G) cellular network, an Integrated Digital Enhanced Network (IDEN) network or a WiMAX network operating in accordance with the IEEE 802.16 standard.

Another example is an IP based network, such as the global Internet, wherein subscribers are subscribed to a Voice over Internet Protocol (VoIP) service, such as Skype. Other examples are a Public Switched Telephone Network (PSTN) and a satellite communication network, e.g. Inmarsat or some Very Small Aperture Terminal (VSAT) based network. In alternative embodiments, however, network 104 may comprise any other suitable network type.

Network 104 provides phone call services to subscribers, typically mobile subscribers. The subscribers are represented in FIG. 1 by CTs that they operate, e.g., mobile phones, which are denoted as 116. The present example shows three CTs for the sake of clarity, although the disclosed techniques can be applied to any number of CTs.

A Candidate Isolation System (CIS) 108 comprises an interface 112, through which it receives from network 104 respective data of CTs 116. In some embodiments, the data is obtained from the network, e.g., using a suitable interface with the service provider's management or operations system. In alternative embodiments, the data is obtained using probes that monitor the CT activity in the network. Hybrid implementations, in which some data is obtained from the service provider and some using probes, are also feasible. In an embodiment, data that relates to a given CT comprises the following:

- CT Identifiers in the network: Typical CT identifiers in a cellular network may comprise, for example, a International Mobile Subscriber Identity (IMSI), a Mobile Subscriber Integrated Services Digital Network Number (MSISDN) and an International Mobile Equipment Identity (IMEI). A typical identifier in a VoIP service may comprise a subscriber-name that was chosen by the service subscriber. A typical identifier in a PSTN network may comprise an E.164 telephone number. CIS 108 may assign to the given CT a generalized CT Identifier (CTI), and associates it with the one or more identifiers that the network provides for the given CT.
- Timing information: Time and duration of calls that were executed through the given CT.
- Target CTIs: CTIs of parties that were called by the given CT within a specified time period.
- Source CTIs: CTIs of parties that called the given CT within a specified time period.
- Locations: For each call event, this is the service area or exact location of the given CT or of the other party of the call.
- Silence period: A time period during which the given CT was recently inactive in the network, optionally in relation to other identifiers such as Target CTI, Source CTI or Location.

CIS 108 comprises a CIS processor 120, which carries out the candidate identification functions described herein. In some embodiments, interface 112 is connected to network probes 124 that continuously monitor the network, and/or to network databases 128 that store network events from which CIS 108 extracts the above CT data for processing in processor 120. Databases 128 may comprise, for example, an operations or management database of the service provider operating network 104. The processor first analyses the CTs data, according to some predefined selection criteria, aiming to identify CTs that are candidates to undergo surveillance actions. An identified CT is thus denoted a "candidate CT" and its CTI is denoted a "candidate CTI." The selection criteria are further explained below.

CIS processor 120 then requests from the network, for each candidate CT, voice from one or more calls that were conducted through the candidate CT. In some embodiments, the voice is obtained directly from the network, e.g., by duplicating the voice calls or media and directing it to the CIS. Alternatively, the voice can be obtained using probes.

The voice typically encompass long enough speaking time, in order to enable reliable, text independent, voice based subscriber identification (also referred to as "speaker recognition"). In an embodiment, the network provides the voice to the CIS in a raw digitized format, which is typically uncompressed, to allow for later reliable voice analysis. Processor 120 processes the voice that is associated with the candidate CT so as to create a voice signature thereof, which aims to uniquely characterize the individual subscriber who uttered this voice.

The term "voice signature", sometimes denoted "voice-print", is used herein to describe any characteristic of the subscriber's voice, e.g., a biometric characteristic, which is unique to the individual subscriber and can be used to recognize or authenticate this subscriber with high likelihood. Finally, processor 120 transfers the created voice signatures, identified by the respective candidate CTIs, to a Voice Matching System (VMS) 132. The VMS comprises a VMS processor 152, which carries out the voice matching functions described herein. An interface 136 within CIS 108 and an interface 140 within VMS 132 pass this candidate data from the CIS to the VMS.

A Surveillance center (SC) 144 is responsible for management and administrative aspects of surveillance system 100 as well as for actual execution of surveillance actions based on CT data extracted from network 104. Typical surveillance actions are, for example, eavesdropping and location tracking of CTs. SC 144 provides VMS 132 with target subscriber data through an interface 148. Data that relates to a given target subscriber may comprise, for example, a voice signature of the target subscriber and her/his reference number in surveillance system 100. VMS processor 152 within VMS 132 accepts this data and writes it to a storage unit 156. Next, processor 152 lookups storage 156 for each voice signature that it receives from CIS 108. Processors 120 and 152 may use any suitable type of voice signature, and any suitable method for speaker recognition using such signatures.

Thus, for each candidate TC identified by CIS 108, processor 152 in VMS 132 attempts to match the voice originating from the candidate TC with one of the voice signatures of the known target subscribers. Upon finding a match between the voice signature of a given candidate CTI and that of a specific target subscriber, the VMS processor recognizes the subscriber (individual) that uses the CT that has the given candidate CTI as the specific target subscriber, whose CTI has been discovered. Consequently, processor 152 creates corresponding match information that comprises the given candidate CTI and the specific target's reference number, and transfers it to SC 144 through interface 148.

SC 144 then carries out, through its connection with network 104, the surveillance actions that are specified for the specific target subscriber, according to her/his discovered CTI. In some embodiments the SC needs to acquire a warrant, from some warrant issuer, for surveying the discovered CTI. Such issuer may comprise a court or other suitable entity.

It may happen, e.g. in case of a cellular or a PSTN external line of an office or an apartment, that the voice that pertains to a given CTI originates from more than one speaker. In this case processor 120 tries to create a voice signature for each speaker, and will associate these multiple voice signatures with the given CTI. Consequently processor 152 will try to match each resulted voice signature with some target signature, aiming to create respective matching information for each found match.

CIS 108 and VMS 132 may be realized, for example, using general-purpose server platforms. In an alternative embodiment, CIS 108 and VMS 132 can be implemented on a single server platform. Processors 120 and 152 are typically realized by one or more dedicated or general-purpose processor cores, which run software for carrying out the methods described herein. The software may be downloaded to the processor cores in electronic form, over a network, for example, or it may, alternatively or additionally, be provided and/or stored on non-transitory tangible media, such as magnetic, optical, or electronic memory. Processors 120 and 152 may be alternatively realized in hardware, typically comprising Field-Programmable Gate Arrays (FPGAs) and/or Application-Specific Integrated Circuits (ASICs), which optionally embed one or more processor cores. Storage unit 156 typically comprises magnetic media, solid-state storage media or optical media. The target subscribers data that is stored in storage 156 is typically organized in a relational database. Interfaces 112, 136, 140 and 148 typically comprise wired or optical connections, however web based connections may be as well used in alternative embodiments.

The arrow directions in FIG. 1 represent the transfer direction of the main information elements that were mentioned above, although information transfer in opposite directions may also take place. The above description of system 100 has focused on the specific elements that are essential for understanding certain features of the disclosed techniques. Conventional elements that are not needed for this understanding have been omitted from FIG. 1 for the sake of simplicity but will be apparent to persons of ordinary skill in the art. The configuration of system 100 shown in FIG. 1 is an example configuration, which is chosen purely for the sake of conceptual clarity. In alternative embodiments, any other suitable system configuration can also be used.

Surveillance Method Description

FIG. 2 is a flowchart that schematically illustrates a method for communication subscriber surveillance, in accordance with an embodiment that is described herein. The method begins with a target reception step 204, wherein VMS 132 receives from SC 144 data that pertain to a group of individuals, denoted as target subscribers, who are surveillance targets. The data of a target subscriber typically comprises a voice signature and a reference number of the target subscriber in surveillance system 100. Processor 152 stores the target subscribers data in storage unit 156.

At a receiving step 208, CIS 108 receives from network 104 data of network events as described above. At a candidate isolation step 212, CIS 108 identifies CTIs that are candidates for subsequent surveillance actions, out of all the CTIs whose data is transferred by network 104 through interface 112. The purpose of this step is, for example, saving resources of dealing with all the CTs of the network at the next steps. In an embodiment, CIS 108 chooses the candidate CTIs according to some predefined selection criteria. Selection criteria may comprise, for example:

The examined CTI was recently inactive in the network during a predefined inactivity period, e.g. a year or a month.

The examined CTI was activated once, made a call to a certain service number, and then became inactive for a predefined inactivity period.

The examined CTI was recently shut down in the network during a predefined inactivity period, e.g. a year or a month.

The examined CTI is new in the network. This is a special case of the previous criterion wherein the shutdown period equals infinity. This criterion in particular allows for detecting target subscribers who have recently started to use a new CTI in the network.

The examined CTI issued calls from a certain predefined geographical area.

The examined CTI received calls from a certain predefined geographical area.

The examined CTI communicates with a party CTI that pertains to a predefined group of CTIs, e.g., communicates frequently with one or more known targets.

Any suitable combination of the above criteria.

In some embodiments, the network itself applies a preliminary CTI isolation step by rough application of the above criteria. After identifying the candidate CTs (CTIs), CIS processor 120 indicates the candidate CTIs to VMS processor 152 of VMS 132.

At a creation step 216, processor 152 requests voice from calls that were executed through candidate CTIs. Processor 152 then analyzes the voice of each candidate CTI and creates a voice signature thereof. At a lookup step 220, processor 152 queries storage 156, attempting to find a target signature that matches the candidate CTI's signature. A match is determined according to some predefined criteria, typically statistical, of voice signatures identity. In some embodiments parameters that affect the probability of false match are controllable by the SC, e.g. match criteria tightness and minimal recording duration. If match is not found, at a match finding step 224, the examined CTI is no longer considered a candidate for surveillance and processor 152 proceeds to the voice signature of the next candidate CTI at step 220.

Upon finding a match, at finding step 224, processor 152 proceeds to a creation step 228 wherein it creates match information comprising the candidate CTI, now referred to as a "discovered CTI" and the reference number of the matching target subscriber, i.e. the target subscriber that has a matching voice signature. The match information indicates that the specific subscriber (the target subscriber whose voice signature in storage unit 156 produced the match) is likely to be the subscriber of the candidate CTI (candidate CT).

At a transfer step 232, processor 116 transfers the match information to SC 144. At an optional checking step 236, SC 144 checks if the CT in question has a valid surveillance warrant. If a warrant is required but does not exist, SC 144 acquires a warrant from some warrant issuer at a warrant issuance step 240 and proceeds to the next step. If a valid warrant exists, or not required, SC 144 skips step 240 and directly proceeds to a surveillance step 244. At this final step SC 144 applies to the discovered CTI the surveillance actions that are specified for the matching target subscriber.

The flowchart shown in FIG. 2 is an example flowchart, which is chosen purely for the sake of conceptual clarity. In alternative embodiments, any other suitable flowcharts can also be used for realizing the disclosed methods. Although the embodiments described herein mainly address surveillance systems, the methods and systems exemplified by these embodiments can also be used in other applications that involve individuals' recognition.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Apparatus, comprising:
a storage unit, which is configured to store targeted data comprising predetermined voiceprints of one or more target subscribers of a communication network, wherein each target subscriber communicates over the communication network using cellular communication terminals, and wherein the communication network comprises a wireless cellular network;
and
at least one processor, which is configured:
to receive from the wireless cellular network, through an interface connected to the wireless cellular network, network event data pertaining to a plurality of cellular communication terminals of the communication network;
to identify a cellular communication terminal from the plurality of cellular communication terminals of the communication network as a candidate for surveillance by processing the received data to detect some predefined selection criteria within the received data,
to request and receive from the wireless cellular network, voice originating only from the cellular communication terminal identified as the candidate communication terminal,
to match the voice from the candidate communication terminal to one or more target subscribers using the stored predetermined voiceprints, and
upon finding the match, to generate match information that indicates that the voice from the candidate communication terminal is likely to have originated from the one or more target subscribers and to output the match information to a surveillance center.

2. The apparatus according to claim 1, wherein the at least one processor is configured to identify the communication terminal as the candidate communication terminal by detecting that the communication terminal uses an identifier that was not used before.

3. The apparatus according to claim 1, wherein the at least one processor is configured to identify the communication terminal as the candidate communication terminal by detecting that the communication terminal is inactive or shut-down for at least a predefined time period.

4. The apparatus according to claim 1, wherein the at least one processor is configured to identify the communication terminal as the candidate communication terminal by detecting that the communication terminal communicates with one or more predefined communication terminals.

5. The apparatus according to claim 1, wherein the at least one processor is configured to output the match information to a surveillance center that is connected to the communication network.

6. The apparatus according to claim 1, wherein the at least one processor is configured to identify the communication terminal as the candidate communication terminal using at least one identifier type selected from a group of types comprising an International Mobile Subscriber Identity (IMSI), an International Mobile Equipment Identity (IMEI), and a Mobile Subscriber Integrated Services Digital Network Number (MSISDN).

7. The apparatus according to claim 1, wherein the at least one processor is configured to receive the voice from at least one source selected from a group of sources consisting of a service provider operating the communication network and a network probe that monitors the communication network.

8. A method, comprising:
   storing targeted data in a storage unit, wherein the stored targeted data comprises predetermined voiceprints of one or more target subscribers of a communication network, wherein each target subscriber communicates over the communication network using communication terminals, and wherein the communication network comprises a wireless cellular network;
   receiving from the wireless cellular network, through an interface connected to the wireless cellular network, network event data pertaining to a plurality of cellular communication terminals of the communication network;
   identifying a cellular communication terminal from the plurality of cellular communication terminals of the communication network as a candidate for surveillance by processing the received data to detect some predefined selection criteria within the received data;
   requesting and receiving from the wireless cellular network, voice originating only from the cellular communication terminal identified as the candidate candidate communication terminal;
   matching the voice from the candidate communication terminal to one or more target subscribers using the stored predetermined voiceprints; and
   upon finding the match, generating match information that indicates that the voice from the candidate communication terminal is likely to have originated from the one or more target subscribers and outputting the match information to a surveillance center.

9. The method according to claim 8, wherein identifying the communication terminal as the candidate communication terminal comprises detecting that the communication terminal uses an identifier that was not used before.

10. The method according to claim 8, wherein identifying the communication terminal as the candidate communication terminal comprises detecting that the communication terminal is inactive or shut-down for at least a predefined time period.

11. The method according to claim 8, wherein identifying the communication terminal as the candidate communication terminal comprises detecting that the communication terminal communicates with one or more predefined communication terminals.

12. The method according to claim 8, wherein outputting the match information comprises providing the association to a surveillance center that is connected to the communication network.

13. The method according to claim 8, wherein identifying the communication terminal as the candidate communication terminal comprises identifying the terminal using at least one identifier type selected from a group of types comprising an International Mobile Subscriber Identity (IMSI), an International Mobile Equipment Identity (IMEI), and a Mobile Subscriber Integrated Services Digital Network Number (MSISDN).

14. The method according to claim 8, wherein receiving the voice comprises accepting the voice from at least one source selected from a group of sources consisting of a service provider operating the communication network and a network probe that monitors the communication network.

\* \* \* \* \*